US009166390B2

(12) United States Patent
Dean et al.

(10) Patent No.: US 9,166,390 B2
(45) Date of Patent: Oct. 20, 2015

(54) OVERHEAD-MOUNTED CABLE AND BUSWAY SUPPORT SYSTEM

(71) Applicant: M.C. Dean Inc., Dulles, VA (US)

(72) Inventors: William H. Dean, Miami Beach, FL (US); Timothy M. Shea, Fairfax Station, VA (US)

(73) Assignee: M.C. DEAN INC., Dulles, VA (US)

( * ) Notice: Subject to any disclaimer, the term of this patent is extended or adjusted under 35 U.S.C. 154(b) by 51 days.

(21) Appl. No.: 14/196,152

(22) Filed: Mar. 4, 2014

(65) Prior Publication Data
US 2015/0255971 A1 Sep. 10, 2015

(51) Int. Cl.
F16L 3/00 (2006.01)
H02G 3/36 (2006.01)
F16L 3/26 (2006.01)

(52) U.S. Cl.
CPC ... H02G 3/36 (2013.01); F16L 3/26 (2013.01)

(58) Field of Classification Search
CPC .................................... H02G 3/36; F16L 3/26
USPC ......... 248/58, 59, 65; 52/220.1, 200.2, 200.6, 52/200.7
See application file for complete search history.

(56) References Cited

U.S. PATENT DOCUMENTS

| 1,830,438 | A | 11/1931 | Miller |
| 3,787,016 | A | 1/1974 | Laval, Jr. |
| 3,923,277 | A | 12/1975 | Perrault et al. |
| 4,442,989 | A | 4/1984 | Hartmann |
| 5,100,086 | A | 3/1992 | Rinderer |
| 5,209,035 | A * | 5/1993 | Hodges et al. ............... 52/220.7 |
| 5,320,439 | A | 6/1994 | Perrault et al. |
| 5,503,354 | A | 4/1996 | Lohf et al. |
| 5,564,658 | A | 10/1996 | Rinderer |
| 5,618,014 | A | 4/1997 | Rinderer |
| 5,634,614 | A | 6/1997 | Rinderer |
| 5,704,571 | A | 1/1998 | Vargo |
| 5,816,542 | A | 10/1998 | Rinderer |

(Continued)

FOREIGN PATENT DOCUMENTS

| CN | 201902700 | 7/2011 |
| CN | 201934797 | 8/2011 |
| FR | 2931532 | 11/2009 |

*Primary Examiner* — Mark Wendell
(74) *Attorney, Agent, or Firm* — Roberts Mlotkowski Safran & Cole P.C.

(57) ABSTRACT

An overhead-mounted cable tray and busway support system is provided for supporting communication cables and power busways that are connected to computer equipment housed within a data center. The system includes a plurality of brackets, and a roof mounting assembly. Each of the brackets is formed by a vertical member, a horizontal mounting member having a central portion affixed to a top end of the vertical member that is mountable directly or indirectly to a building roof, two cable tray supports connected to the vertical member at different points, and a busway support. The tray supports and the busway support are cantilevered from a same side of the vertical member so that all of the cables and busways may be conveniently installed from the front side of the cabinets housing the computer equipment. The horizontal mounting member is parallel to the tray supports to resist the torque applied to the brackets from the one-sided weight load of the cables and busways. The busway support mounts two or more horizontal busways at different heights and vertically-staggered with respect to each other to facilitate the installation of busplugs that provide power to the computer equipment.

19 Claims, 5 Drawing Sheets

(56) References Cited

U.S. PATENT DOCUMENTS

| | | |
|---|---|---|
| 5,868,361 A | 2/1999 | Rinderer |
| 5,918,432 A * | 7/1999 | Mahone et al. ............. 52/220.2 |
| 6,082,690 A | 7/2000 | Durin et al. |
| 6,293,056 B1 * | 9/2001 | He ................................... 52/39 |
| 7,470,867 B1 | 12/2008 | Cope et al. |
| 7,520,476 B2 | 4/2009 | Caveney et al. |
| 8,210,198 B1 * | 7/2012 | Majocka ....................... 137/360 |
| 8,567,734 B2 | 10/2013 | McCoy |
| 2004/0104322 A1 | 6/2004 | Hennequin |
| 2012/0240495 A1 * | 9/2012 | Eychaner et al. ............ 52/220.6 |
| 2012/0267483 A1 | 10/2012 | Colvin |

* cited by examiner

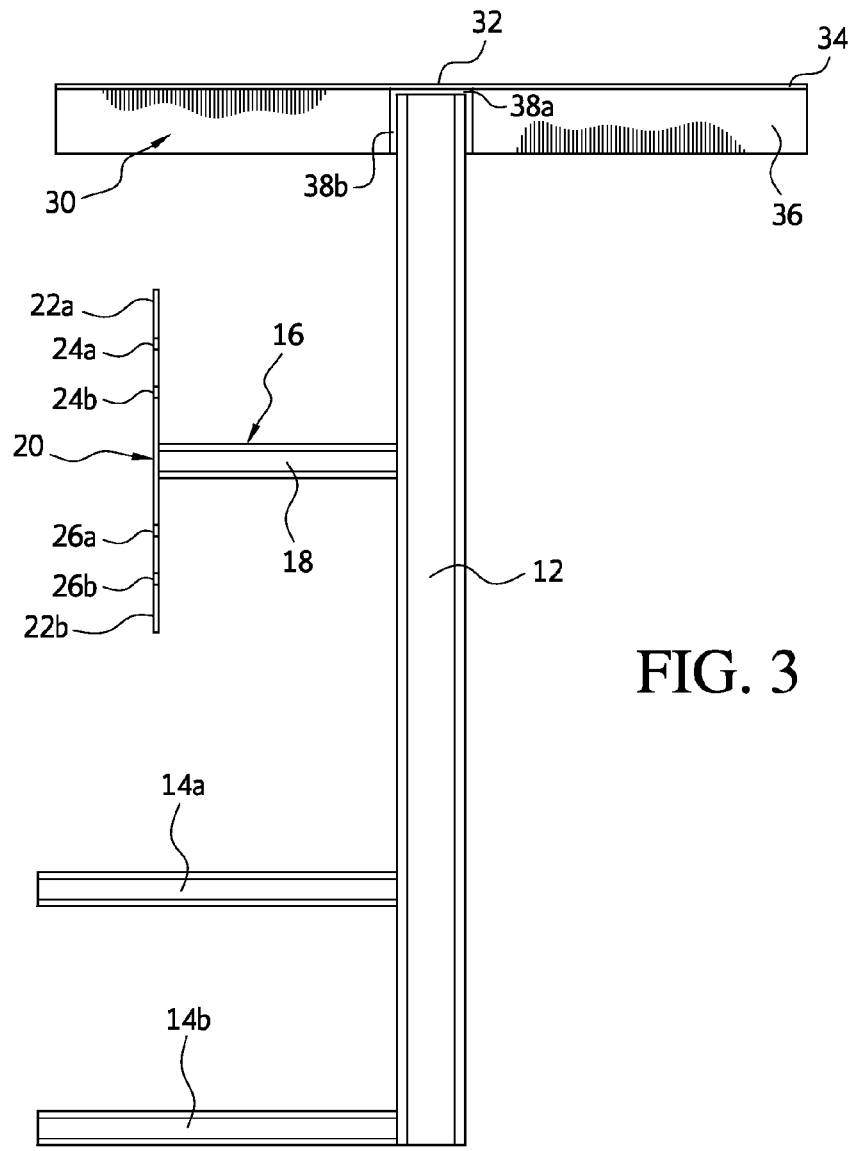
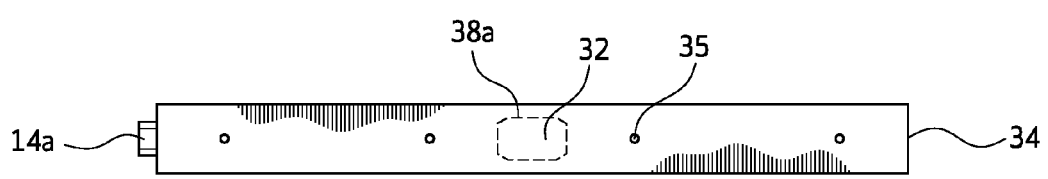

OVERHEAD-MOUNTED CABLE AND BUSWAY SUPPORT SYSTEM

FIELD

This invention generally relates to a cable support system for a building, and is specifically concerned with a two-tiered, overhead-mounted cable tray and busway support system for separately supporting redundant power busways and data communication cables for digital processing equipment.

BACKGROUND

Systems for supporting data communication cables in buildings housing large amounts of computer equipment are known in the prior art. Some of these prior art systems include rows of cable-supporting brackets suspended from rails attached to the underside of the roof of the building. The rows of brackets hang over rows of server racks and other data-processing equipment. Each of the brackets is shaped like an inverted "T", where the stem corresponds to a vertical support member, and the two sides of the hat of the inverted "T" correspond to a pair of opposing support arms for supporting cable trays on either side of the vertical support member. In operation, the vertical support members of the brackets are mounted on the overhead-mounted rails. Next, cable tray sections are mounted on the opposing support arms to form two, parallel cable trays on either side of each row of brackets. In systems having a height-adjustable mechanism, the height of each row of brackets is made to be as uniform as possible so that the adjoining edges of the tray sections are mutually aligned. Finally, the communication cables are lifted up, laid into, and sometimes pulled along the cable trays to properly position them. Such cable support systems are often used in data centers housing rows of server racks or other data-processing equipment.

SUMMARY

While such overhead-mounted cable support systems are generally useful, the applicant has observed a number of shortcomings in such systems that limit their utility. For example, in many such data centers, the depth and density of the cabinets or racks containing the digital equipment only allows access to the cable support system from the front sides of the equipment cabinets. While such one-sided access poses no difficulty for the installers to lift and install the cables in the front-facing cable tray, installation of the cables in the back-facing cable tray is awkward and time-consuming, often requiring the cables to be "threaded" around the vertical support member of the support brackets and pulled into position over the back-facing tray. Another problem arises from the cooling chimneys present on the equipment cabinets. These chimneys extend upwardly from the back half of the cabinets in order to funnel air heated by the equipment into a plenum space defined between the underside of the building roof and a ceiling suspended beneath the roof. If the front-facing cable tray is positioned far enough back from the front side of the equipment so as not to interfere with the walkway aisles between adjacent rows of digital processing equipment, the back cable tray may interfere with the cooling chimneys. If one attempts to solve these problems by eliminating the back-facing tray and tray supports so that all of the weight of the cables is borne by a single front-facing cable tray, the resulting imbalance in the weight applies a substantial backwards-oriented torque to the brackets which can swing them into an interfering position with the chimneys extending from the back half of the equipment cabinets. If one attempts to counteract the torque by reinforcing the system with additional brackets, the weight and expense of the support system substantially increases.

Another limitation of prior art cable support systems is their lack of ability to support, in any practical fashion, the cables or busways that provide electrical power to the digital processing equipment. To fully appreciate this limitation, some background is necessary. In the past, the power cables were installed between a raised floor which supported the digital processing equipment, and the actual floor of the building. However, such a configuration makes it difficult to re-route and re-connect power cables whenever the digital equipment is added, replaced or relocated on the floor of the building. Often when such changes are made the old cables are simply cut and left in place while new cables are snaked into place and connected. Over time, such a procedure leaves a "rat's nest" of cables that makes it difficult to distinguish between "live" and "dead" cables and further interferes with the efficient re-routing and re-connection of power cables.

A possible solution to these problems would be to install busways on the cable support system. Such busways are similar in shape to a common two-by-four piece of lumber and include a series of plug-in ports along their lengths for receiving busplugs. The busplugs are in turn connected to a relatively short power cable or "whip" that ends in a female plug which receives the male plug of the equipment. In contrast to floor-mounted power cables, such an arrangement would make it easy to re-route and reconnect power cables whenever the digital equipment is added, replaced or relocated on the floor of the building. Such an arrangement would also obviate the need for a raised floor, thereby lowering construction costs.

However, the installation of busways on prior art cable support systems generates additional problems that are yet unsolved. Modern "mission-critical" data centers require redundant sets of power sources to provide a reliable, uninterrupted flow of electrical power to the digital processing equipment. Since such redundant power requirements doubles the number of busways and busplugs that the brackets of the cable support system must bear, the resulting mechanical load on the support brackets becomes quite substantial as the combined weight of the data communication cables and copper-laden power cables can amount to 134 lbs. per linear foot or more. This in turn would exacerbate the backwards-oriented torque applied to overhead-mounted brackets having only a single, front facing tray. Additionally, code regulations prohibit merely laying the dual busways in the trays that support the communication cables, and no prior art cable system has any provision for separately supporting a pair of busways away from the cable trays.

Consequently, there is a need for a overhead-mounted cable tray and busway support system that allows the data communication cables to be easily installed from the front side of the equipment cabinets by simply lifting them over the cabinets and laying them directly in the cable trays without the need for "threading" the cables through interfering portions of the support system. There is a further a need for such a system wherein any torque applied to the brackets as a result of weight load imbalances is sufficiently counteracted so that the brackets do not swing backwardly into an interfering position with the chimneys extending upwardly from the back half of the equipment cabinets. There is also a need for such a system that can support a pair of busways separately from the cable trays. It would also be desirable if the busways could be easily installed on the same side of the support system as the cables again by simply lifting them over the cabinets of the digital equipment and fastening them onto the support system without mechanical interference between the busways or their respective terminal boxes. Ideally, such a support system would allow the busplugs to be easily and quickly attached to the busways and would secure the busways against any movement from the forces applied during the installation or removal of busplugs. Finally, the support system should have a roof mounting assembly that allows the height of the brackets to be adjusted so that all of the trays may be aligned at a same height. Such a feature would provide uniform-height cable pathways through the building space, avoid localized stress concentrations from the weight of the cables, and facilitate the installation of a plenum-forming tile ceiling below the underside of the roof.

To these ends, the overhead-mounted cable tray and busway support system of the invention comprises a plurality of roof-supported brackets, each of which includes a vertical member, a horizontal mounting member affixed to a top end of the vertical member that is mountable directly or indirectly to the underside of a building roof, two or more tray supports connected to the vertical member, and a busway support also connected to the vertical member above the tray supports.

The tray supports and the busway support are cantilevered from a front side of the vertical member so that the cables and busways may be lifted upwardly from the access aisle in front of the cabinets and easily installed in the cable trays or on the busway support without the need for "threading" these components around interfering brackets components. The vertical support member is preferably formed from tubular steel having a rectangular cross-section for resisting the torque applied thereto as a result of having the entire weight load applied to the front side of the bracket. The busway support mounts two horizontal busways at different heights and vertically-staggered with respect to each other to provide screwdriver access to the top and bottom surface of both busways that facilitates the installation of busplugs on the busways. Preferably, the busway support is shaped like a sideways "T", having a stem cantilevered from the vertical support member of the bracket, and a hat defining upper and lower flanges that provide mounting surfaces for busway brackets that surround and secure the busways against front and back movement during the installation or removal of the busplugs.

The horizontal support member is parallel to the tray supports and hence is orthogonal to the direction of the cables and busways supported by the bracket. It is rigidly connected at its midpoint to the top end of the vertical support member. The horizontal support member is at least as long as, and preferably twice as long as, as the tray supports of the brackets. Hence the torque applied to the vertical member as a result of the weight load of the cables and busways is distributed over the relatively long length of the horizontal support member, which prevents localized buckling stresses from acting on the support rail that the horizontal support member is connected to. Preferably, this member includes integrally-formed horizontal and vertically-oriented flanges, wherein the vertically-oriented flange stiffens the horizontal member against bending in response to the aforementioned torque. The top end of the vertical support member is welded to or otherwise securely connected to both the horizontal and vertical flanges to provide a strong and rigid connection.

The cable tray and busway support system further comprises a roof mounting assembly that includes the previously-mentioned rail members suspended from an underside of the roof of a building. Like the horizontal support member of each of the brackets, the rail members are parallel to the tray supports of the brackets and are orthogonally oriented to the direction of the cables and busways supported by the brackets. The roof mounting assembly preferably includes a pair of threaded rods that are threadedly engaged at one end at different points along an axis of the rail member, and threadedly engaged at an opposite end either directly or indirectly to the roof of a building such that the height and horizontal angle of the rail members (and hence the tray supports) may be adjusted to a same height and angle.

BRIEF DESCRIPTION OF THE DRAWINGS

FIGS. 3 and 4 are a side and top view of the bracket of FIG. 2, respectively;

DETAILED DESCRIPTION OF A PREFERRED EMBODIMENT

Figure 1:
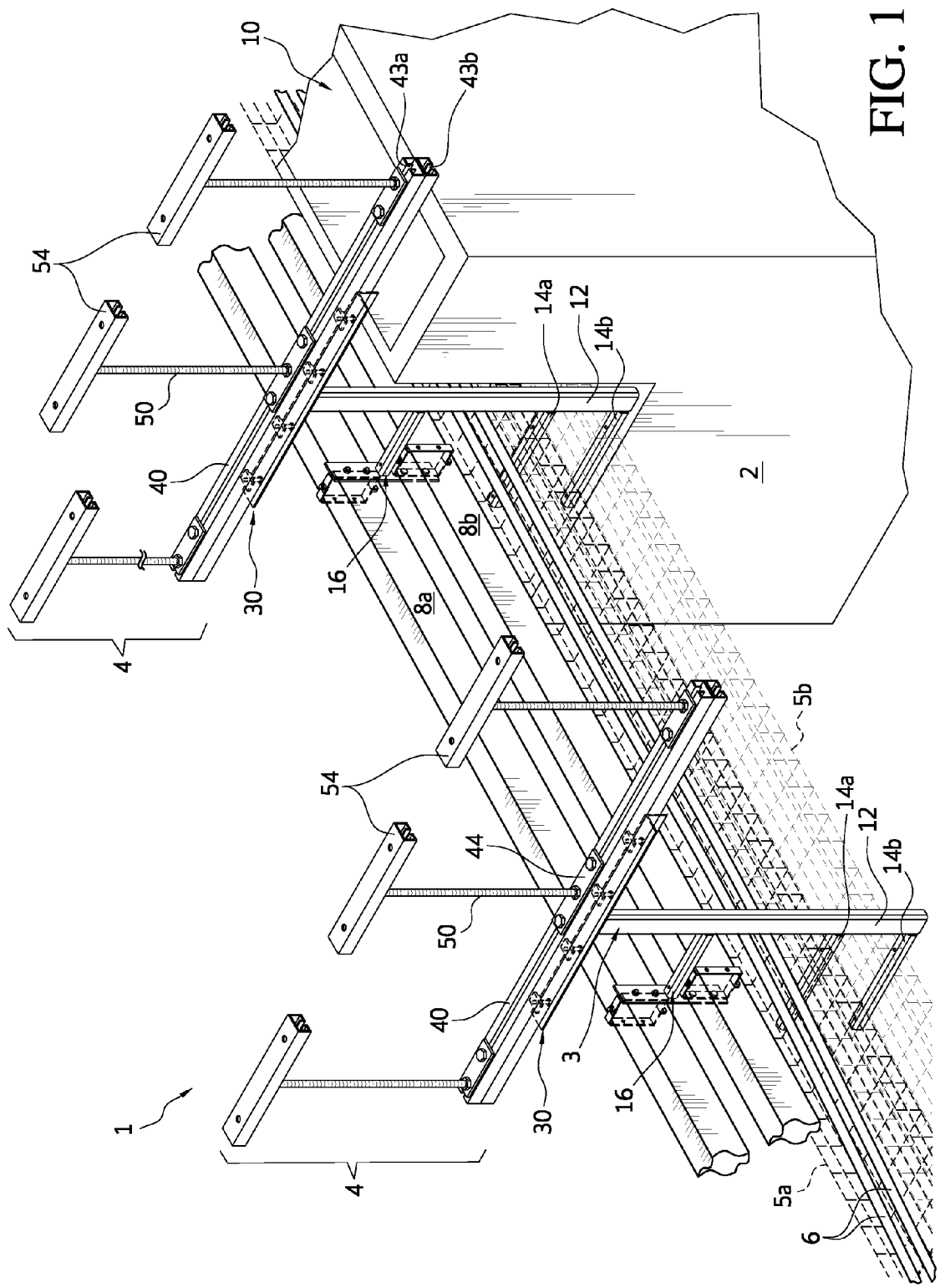
FIG. 1 is a perspective view of the overhead-mounted cable and busway support system of the invention installed over a row of digital processing equipment.

FIG. 1 illustrates a preferred embodiment of the cable tray and busway support system 1 of the invention mounted over a row of cabinets 2 containing digital processing equipment. The system 1 generally comprises a plurality of overhead-mounted brackets 3, and a roof mounting assembly 4 that suspends the brackets 3 in rows from an overhanging structure of the building over the cabinets 2 as shown. The overhanging structure that the roof mounting assembly 4 is suspended from may be the underside of a roof of either a one-story building or the top story of a multi-story building. The overhanging structure may also be the underside of the structure of the next floor up in a multi-story story building. Accordingly, the roof mounting assembly 4 need not literally be suspended from a roof to fall within the scope of the invention, and in the context of this application, the term "roof" is to be broadly construed as any overhanging structure within a building. Each of the brackets 3 supports a pair of cable trays 5a, 5b arranged in "bunk-bed" fashion which carry data communication cables 6. Each of the brackets 3 further supports a pair of busways 8a, 8b that provide redundant power sources for the equipment contained within the cabinets 2. Each of the cabinets 2 includes a cooling chimney 10 extending upwardly from its back half that funnels a flow of air heated by the equipment in the cabinets 2 to a plenum space in the building defined between the underside of the roof and a suspended ceiling (neither of which are shown in FIG. 1). As is described in more detail hereinafter, the system 1 is advantageously capable of receiving and supporting the considerable 134 lb./linear ft. weight of the trays, cables, busways, and busplugs from the front side of the cabinets 2 without swinging against the chimneys 10.

Figure 2:
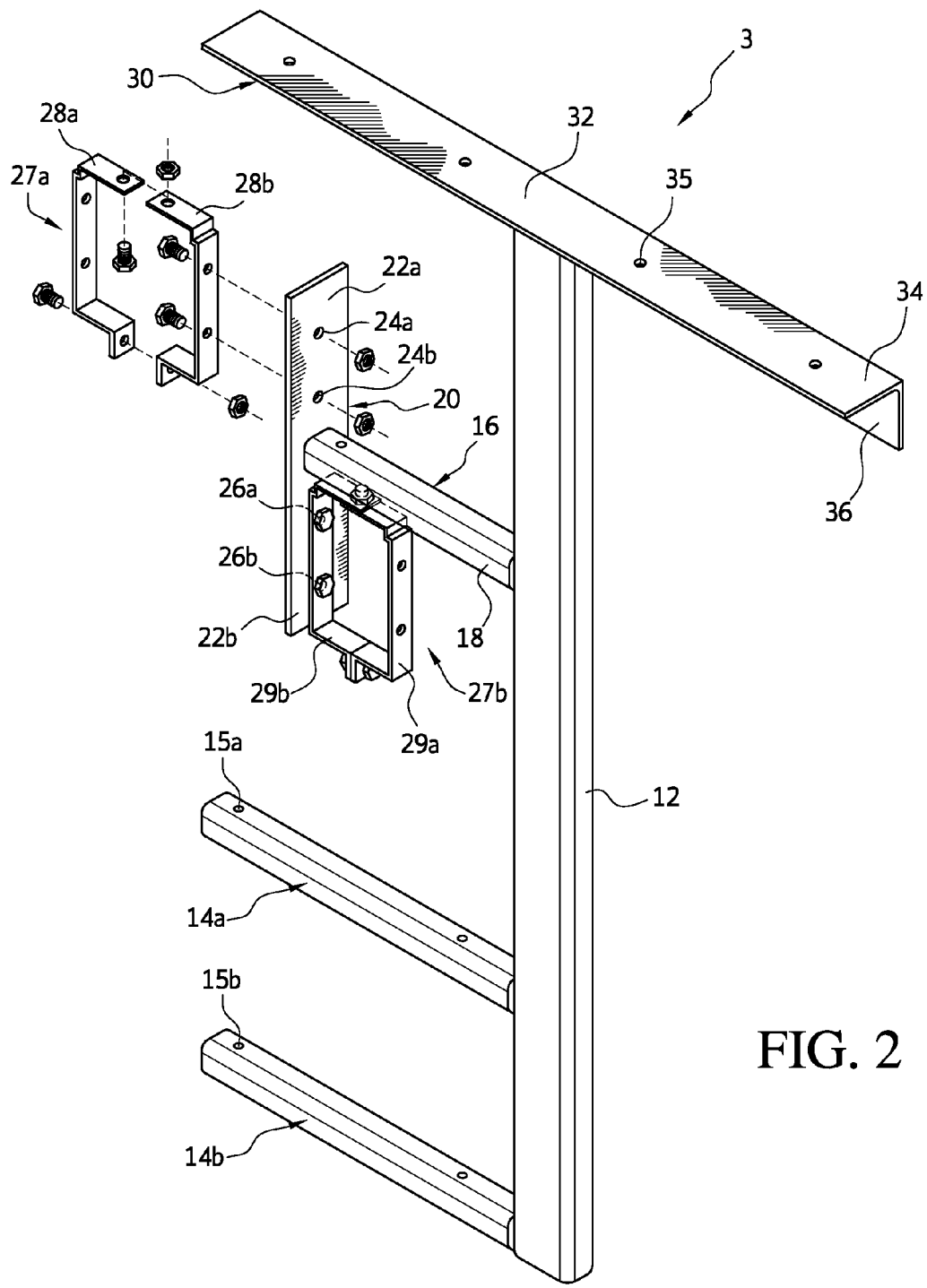
FIG. 2 is a perspective view of the support brackets used in the system illustrated in FIG. 1.

With reference now to FIGS. 2, 3 and 4, each of the brackets 3 includes a vertical support member 12. In the preferred embodiment, member 12 is formed from tubular steel having a generally rectangular cross-section for strength purposes. Such tubular steel provides considerable bending resistance with a minimum of weight. In the preferred embodiment, member 12 may be for example a 62.0 inch length of 4 inch by 2 inch rectangular tubular ASTM A500 Grade B steel ¼ inch thick having a minimum yield strength of 46 ksi. Each of the brackets 3 further includes a pair of parallel tray supports 14a, 14b cantilevered at different heights from the vertical support member 12 as shown. Each of the tray supports 14a, 14b includes screw holes 15a, 15b for receiving screws (not shown) that secure the trays 5a, 5b to the brackets 3. Like the member 12, the tray supports 14a, 14b are also preferably formed from tubular steel for its overall rigidity and light weight. In the preferred embodiment, each of the tray supports 14a, 14b may be for example a 21.0 inch length of 2 inch by 2 inch rectangular tubular ASTM A500 Grade B steel ¼ inch thick having a minimum yield strength of 36 ksi. While the brackets 3 in this example have two tray supports, a single support or three or more such supports are within the scope of the invention. However, the use of two or more tray supports 14a, 14b is preferred over the use of a single, longer tray support for at least two reasons. First, the stresses where the two supports 14a, 14b are cantilevered on the vertical support member 12 is less than it would be if there was only one such joint carrying the entire load of cables 6. Second, the moment forces generated by the weight of the cables 6 on two shorter supports 14a, 14b are less than the moment forces that would be generated by the weight of the cables on a single, longer tray support. For this purpose, it is preferred that the length of each of the supports 14a, 14b be no more than one-half, and preferably about one-third the length of the vertical support member 12. The consequent reduction in moment forces is a substantial advantage of the invention, since these moment forces, if not successfully limited and resisted, would cause the brackets 3 to swing backwards into a potentially interfering position with the cooling chimney 10 of the cabinets 2.

Each of the brackets 3 further includes a busway support 16 that is shaped like a sideways "T". The stem 18 of the support 16 is cantilevered at one end to the vertical support member 12 in the same direction as the tray supports 14a, 14b. The hat 20 of the support 16 includes upper and lower flanges 22a, 22b, each of which includes bolt holes 24a, 24b and 26a, 26b respectively. The upper and lower flanges 22a, 22b each support a pair of busway brackets 27a, 27b, respectively for captively securing the busways 8a, 8b to the bracket 3. Each of the busway brackets 27a, 27b is formed from a pair of opposing C-shaped members 28a, 28b and 29a, 29b. One of each of the pair of C-shaped members 28a, 29a is bolted on to the upper and lower flanges 22a, 22b respectively. The other of the pair of C-shaped members 28b, 29b is bolted on to the flange-mounted C-shaped member 28a, 29a as shown. The resulting busway brackets 27a, 27b are bolted on opposite sides of the upper and lower flanges 22a, 22b so that they are vertically staggered with respect to one another. Such vertical staggering results in the busways 8a, 8b being vertically staggered after they are captured within the busway brackets 27a, 27b. To appreciate the importance of this feature, it is necessary to know that the busplugs that connect the electrical power in the busways 8a, 8b to the equipment in the cabinets 2 are installed by screws that enter the top and bottom walls of the busways 8a, 8b. Such vertical staggering advantageously provides the access necessary for a screwdriver to install or remove these busplug mounting screws (not shown). By contrast, if the busway brackets 27a, 27b were bolted on the same sides of the upper and lower flanges 22a, 22b so that they were vertically aligned with respect to one another, the access space between the bottom wall of the upper busway 8a and the top wall of the lower busway 8b would be only about two inches, making it difficult to insert or remove the busplug mounting screws.

Finally, each of the brackets 3 further includes a horizontal mounting member 30. This mounting member 30 is parallel to the tray supports 14a, 14b and the stem 18 of the busway support 16. Member 30 is further connected to the top end of the vertical support member 12 at a central portion 32 which preferably corresponds to its midpoint. Additionally, as is best seen in FIGS. 3 and 4, the length of the member 30 is preferably about twice as much as the length of the tray supports 14a, 14b for reasons which will be given hereinafter. Horizontal mounting member 30 is formed from two integrally-connected, rectangular flanges as best seen in FIG. 2, including a horizontally-oriented mounting flange 34 with bolt holes 35 to facilitate attachment to the rails of the roof mounting assembly 4, and a vertically-oriented stiffening flange 36. As is best seen in FIGS. 3 and 4, the top edge of the tubular vertical support member 12 is connected to the mounting flange 34 via a weld joint 38a, while one side of the top end of the vertical support member 12 is connected to the stiffening flange 36 via a weld joint 38b. The provision of the vertical stiffening flange 36 in the horizontal mounting member 30, and the provision of dual welds 38a, 38b between the top end of the vertical support member 12 and the mounting and stiffening flanges 34, 36 render the connection between the vertical member 12 and horizontal member 30 strong and resistant to the torque applied to the bracket 3 due to the imbalanced weight load applied by the cables and busways to only the front side of the bracket 3. Additionally, the relatively long length of the horizontal mounting member 30 advantageously allows it to distribute this torque over a relatively long length of the rail to which it is connected. In the preferred embodiment, the horizontal mounting member 30 may be formed from a 44 inch-long piece of 4×4 inch angle steel ¼ inch thick.

Figure 5:
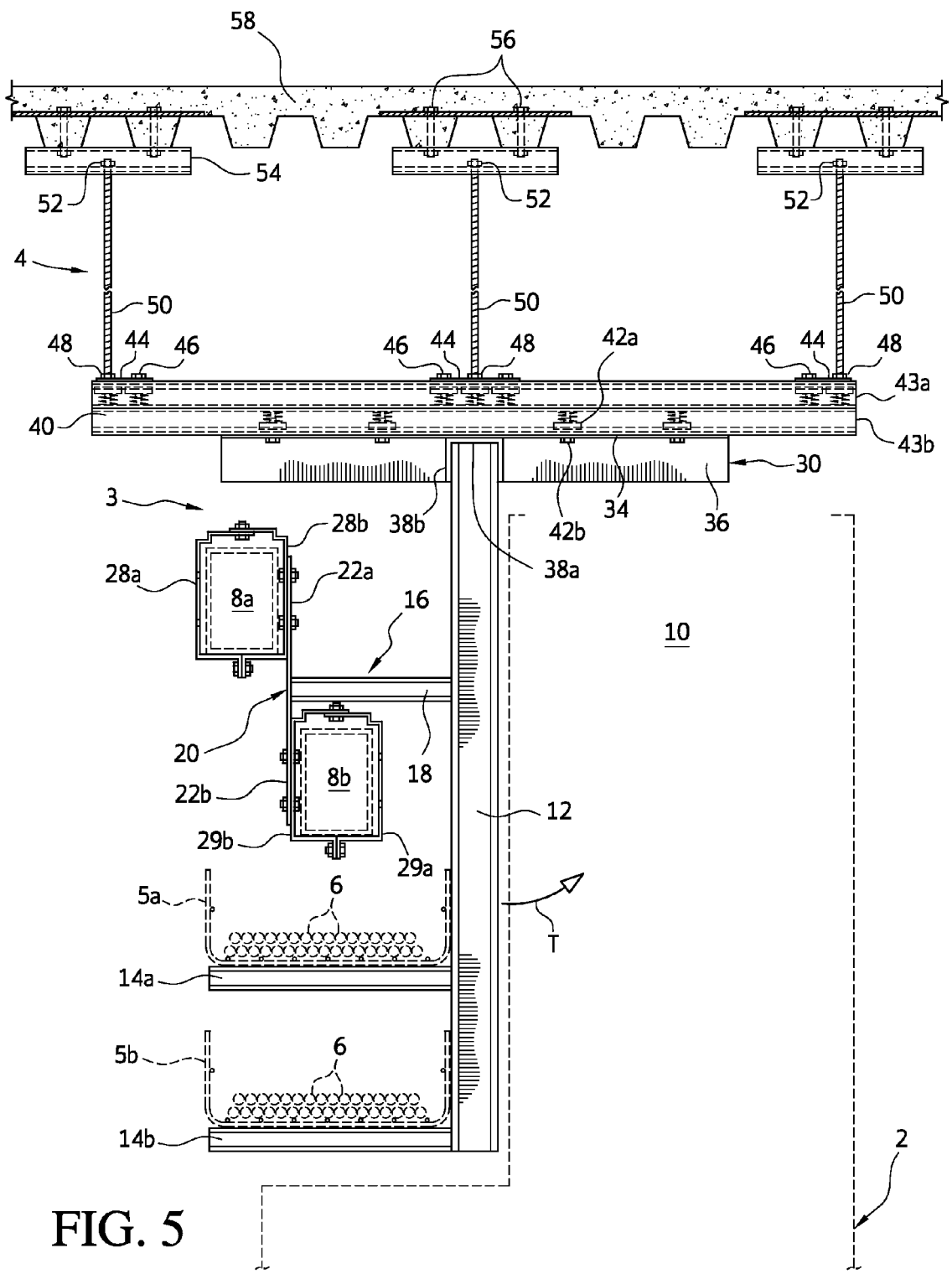
FIG. 5 is a cross-sectional view of the overhead-mounted cable and busway support system illustrated in FIG. 1.

With reference now to FIG. 5, the roof mounting assembly 4 of the system 1 includes a plurality of rails 40 to which the horizontal mounting members 30 of the brackets 3 are connected via spring nuts 42a and bolts 42b. In the preferred embodiment, the rails 40 are formed from P1001 Unistrut® steel rail material having an H-shaped cross-section. Rails 40 are orthogonally-oriented with respect to the longitudinal axes of the cables 6, busways 8a, 8b and trays 5a, 5b. Hence the rails 40 are also orthogonally-oriented to the axis of rotation of the torque T applied to the top end of the vertical support member 12 from the one-sided load exerted by the 134 lb./ft weight of the cables 6 and busways 8a, 8b, This in turn allows the rails 40 to much better resist such torque and to maintain the brackets 3 in the vertical orientation illustrated in FIG. 5, instead of canting backwardly into the chimneys 10 of the cabinets 2. Additionally, the relatively long length of the horizontal mounting member 30 effectively distributes this torque over a relatively long length of the rails 40, thereby preventing buckling, warpage, or other deformation of the rails 40. Although the length of the member 30 is preferably about twice as much as the length of the tray supports 14a, 14b, a length as short as the length of the tray supports 14a, 14b is also within the scope of the invention.

With reference now to FIGS. 1 and 5, the rails 40 of the roof mounting assembly 4 include upper and lower slots 43a, 43b, respectively. The bolts 42b that fasten the horizontal mounting member 30 of the brackets to the rails 40 extend through the previously-mentioned bolt holes 35 in the mounting flange 34 and through the lower slot 43b of the rail 40, where they are secured by the spring nuts 42a. The use of a continuous slot 43b in lieu of bolt holes in the rail 40 allows for adjustability in the position of the brackets 3 along the longitudinal axes of the rails 40. In prior art cable support systems, such adjustability was not necessary, since the rails supporting the brackets were always parallel to the rows of equipment cabinets serviced. However, in the present system 1, since the support rails 40 are orthogonal to the rows of digital equipment cabinets 2 that the cable support system 1 services, such adjustability is particularly valuable since it allows the brackets 3 to be easily moved to a position where they line up in parallel to the rows of cabinets 2, and align with a grid suspended ceiling.

Turning now to the remaining components of the roof mounting system 4, a series of rectangular plates 44 are secured over the top surfaces of the rails 40 via mounting bolts 46. Bolts 46 extend through bolt holes in the plates 44 and through the upper slot 44a, where they are affixed via nuts. Each of the plates 44 includes a threaded fitting 48 that receives the lower end of a threaded rod 50. The upper ends of the rods 50 are in turn screwed into threaded fittings 52 present in a series of struts 54 that are affixed by bolts 56 to the underside of a building roof 58. Some advantageous amount of lateral adjustability is again provided between the plates 44 and their axial position on the rails 40 since the bolts 46 can be slid along the upper slot 44a before being tightened and affixed to a desired position along the slot 44a. Additionally, the use of threaded rods 50 to connect the rails 40 to the struts 54 advantageously allows the height of the rails 40 (and hence the brackets 3) to be adjusted. Such height adjustability not only allows the brackets 3 to be positioned at an optimum distance between the tops of the cabinets 2 and the roof 58; it also allows the height of the brackets 3 to be adjusted so that the cable trays 5a, 5b and busways 8a, 8b are all level.

Figure 6:
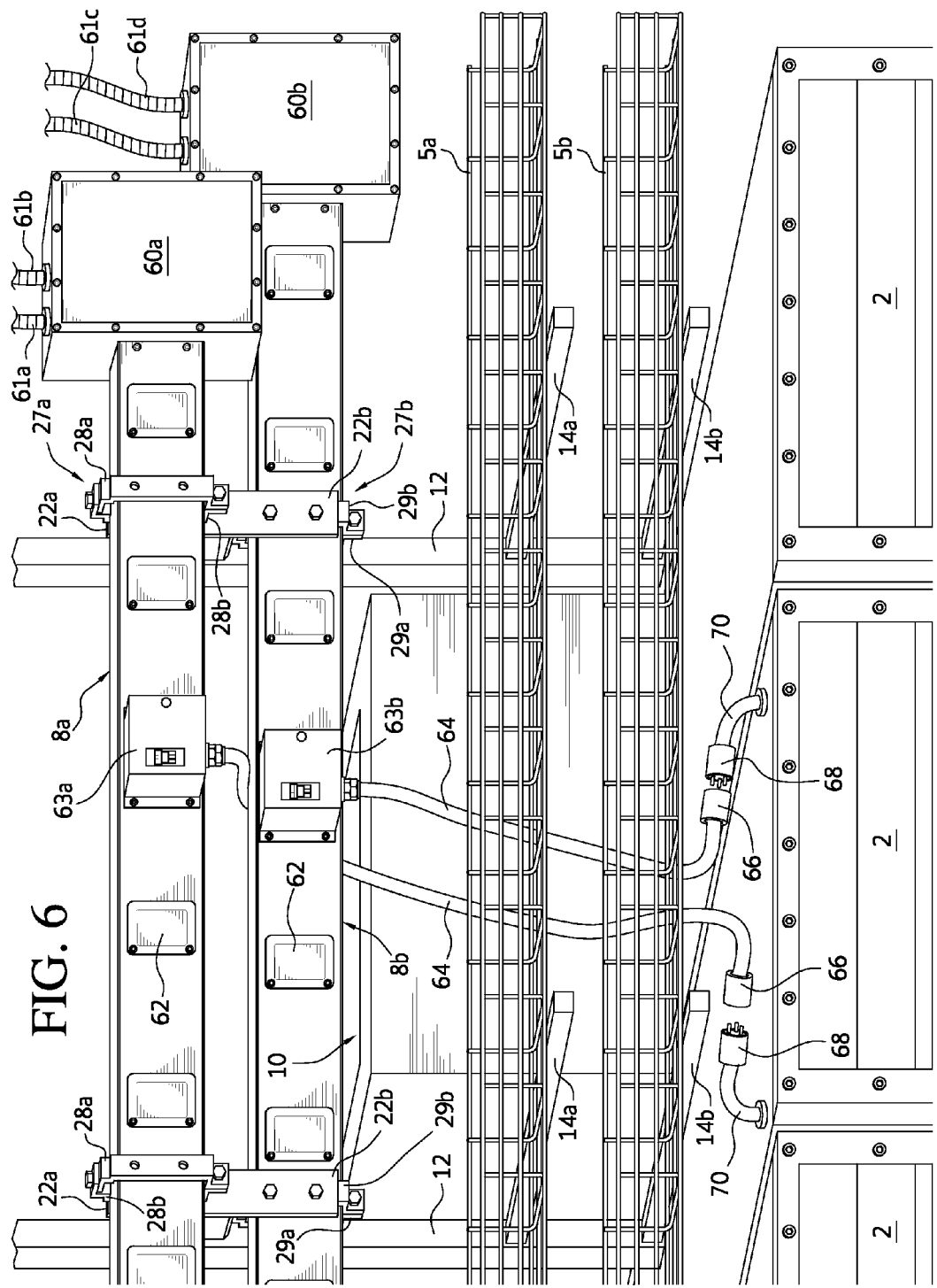
FIG. 6 is a side view of the overhead-mounted cable and busway support system of FIG. 1.

FIG. 6 is a side view of the overhead-mounted cable and busway support system 1 in operation over a row of cabinets 2 containing digital processing equipment. Each of the busways 8a, 8b includes a terminal box 60a, 60b at one end. Each terminal box 60a, 60b is in turn connected to a different power source via cables 61a, 61b and 61c, 61d, respectively. Each of the busways 8a, 8b includes a row of equally-spaced, removable windows 62. Each window 62 covers a power receptacle (not shown) that a busplug 63a, 63b may be plugged into. Each busplug 63a, 63b is connected to a power cord 64 that terminates in a female plug 66. Each cabinet 2 is electrically connected to the female plug 66 of each of the busways 8a, 8b via a male plug 68 at the end of a power cord 70 that is electrically connected to the digital processing equipment in the cabinets 2. Such an arrangement ensures that power will continuously be supplied to the digital processing equipment in the cabinets 2 even if one or the other of the separate power sources connected to the busways 8a, 8b via power cables 61a, 61b should fail.

The installation steps associated with the cable and busway support system 1 may best be appreciated with reference to FIGS. 1, 5, and 6. First the roof mounting assembly 4 is installed. This is accomplished by mounting the struts 54 on the roof 58 via bolts 56. Next, the rails 40 (to which the rectangular plates 44 have been loosely pre-attached via bolts 46 so that they are slidable along the rail slot 43a) are connected to the struts 54 by screwing the threaded rods 50 in the threaded fittings 52 of the struts 54 and in the threaded fittings 48 of the plates 44. The lateral positions of the rectangular plates 44 are slidably adjusted along the rails 40 as needed while the height and levelness of the rails are adjusted via the threaded rods 50. The plates 44 are then secured into proper position on the rails 40 by tightening the bolts 46.

After the roof mounting assembly 4 has been installed, the brackets 3 (which have been conveniently manufactured off-site) are mounted on the rails 40. This is accomplished by pushing together the nut and spring forming the spring nuts 42a, turning the compressed spring nuts sideways, inserting them through the bottom slot 43b of the rails 40 and releasing them. When so inserted and released, the spring expands and pushes the nut of the spring nut 42a downwardly into the position shown in FIG. 5. The internal walls of the rails 40 are far enough away from the hexagonal faces of the spring nuts 42b to allow them to be slidably moved along the axes of the rails 40, but close enough to the hexagonal faces of the spring nuts 42b to prevent their rotation. Mounting bolts 42b are next inserted through the bolt holes 35 of the horizontal mounting member 30 of each bracket 3. Alignment between the spring nuts 42a and mounting bolts 42b is easily accomplished by sliding the spring nuts 42a into proper position along the rails 40. The bolts 42b are then loosely threaded into the spring nuts 42a. If the position of the bracket needs to be adjusted along the rail 40, the bracket may be slid into the appropriate position. The bolts 42b are then snugged up as shown in FIG. 5 to securely mount the bracket 3 into position on its respective rail 40.

After the brackets 3 have been mounted on the rails 40, the busways 8a, 8b are secured onto the upper and lower portions 22a, 22b of the hat 20 of the busway support 16 by the busway brackets 27a, 27b. As previously indicated, this is accomplished by first attaching the flange-mounted C-shaped bracket halves 28a, 29a to opposite sides of the upper and lower portions 22a, 22b of the mounting flange, lifting the busways 8a, 8b and inserting them into the flange-mounted C-shaped bracket halves 28a, 29a, and then attaching the connecting C-shaped bracket halves 28b, 29b thereto via screws so that the busways 8a, 8b are captured, but not clamped, so that they are slidably moveable within resulting busway brackets 27a, 27b. Such slidable movement advantageously allows the position of the busways 8a, 8b to be adjusted relative to the cabinets below. It also allows positions of the busways 8a, 8b to be adjusted with respect to each other, which is use in avoiding interference between the terminal boxes 60a, 60b located at the ends of the busways 8a, 8b. Next, the cable trays 5a, 5b are laid over the tray supports 14a, 14b and secured thereon via screws (not shown) inserted in the screw holes 15 of the supports 14a, 14b. Finally, the data communication cables 6 are then lifted up and laid into the cable trays 5a, 5b from the front side of the cabinets 2.

To complete the installation of the system 1, a pair of busplugs 63a, 63b is installed in the busways 8a, 8b over each of the cabinets 2 to provide redundant power sources to the digital equipment inside. To this end, one of the windows 62 from each of the busways is removed to expose a female receptacle. Next, the prongs of the busplugs 63a, 63b are inserted into the female receptacles. Screws (not shown) are then used to secure the busplugs 63a, 63b to the top and bottom walls of the busways 8a, 8b. Despite the substantial force required for such busplug insertion, the lateral support provided by the busway brackets 27a, 27b is more than sufficient to resist not only these insertion forces, but also the forces applied in the opposite direction when the busplugs 63a, 63b are pulled out of the busways 8a, 8b. Moreover, the vertically-staggered relative positioning of the busways 8a, 8b provide by attaching the C-shaped bracket halves 28a, 29a to opposite sides of the upper and lower portions 22a, 22b of the mounting flange of the busway support 16 provides easy screwdriver access to the upper and lower walls of the busways 8a, 8b as previously described.

The one-sided load exerted by the 134 lb./ft weight of the cables 6 and busways 8a, 8b, applies a substantial torque (indicated by the arrow T in FIG. 5) to the brackets 3 which, if unresisted, would cause them to swing backwardly away from the front faces of the cabinets 2 into the cabinet chimneys 10. However, the orthogonal orientation of the rails 40 relative to the axis of rotation of the applied torque, the relatively long length of the horizontal mounting members 30, the provision of a vertically-oriented stiffening flange 36 on the horizontal mounting members 30, and the dual weld connections between 38a, 38b between the top of the vertical support member 12 and the horizontal and vertical flanges 34, 36 of the horizontal mounting member 30 are able to limit backward deflection of the brackets 3 to only about 0.50 inches for brackets 3 approximately 62.0 inches in height carrying cable and busway weights of approximately 134 lbs./ft. Moreover, the applicant has found that brackets 3 made with the previously-described type of steel stock components and in the relative proportions indicated in the several Figures can easily support such weight even when spaced 8.0 feet apart, which would apply an average load of about 1070 lbs. per bracket.

Although the invention has been described in detail with particular reference to a preferred embodiment, it will be understood that variations and modifications can be effected within the spirit and scope of the invention, which is limited only by the recitations of the appended claims and equivalents thereof.

The invention claimed is:

1. An overhead-mounted cable tray and busway support system, comprising:
    at least one roof-supported bracket including
        a vertical member,
        a horizontal mounting member affixed to a top end of the vertical member that is mountable directly or indirectly to a building roof,
        at least one tray support connected to the vertical member,
        a busway support connected to the vertical member and having a busway retaining flange that mounts two or more horizontal busways at different heights, and
    a roof mounting assembly that includes a rail member suspended from an underside of a roof of a building that is parallel to and connected to the horizontal mounting member of the bracket, wherein both the rail member and horizontal mounting member are parallel to the at least one tray support.

2. The overhead-mounted cable tray and busway support system of claim 1, wherein the at least one tray support and the busway support are cantilevered from a same side of the vertical member and are parallel to one another.

3. The overhead-mounted cable tray and busway support system of claim 1, wherein the horizontal mounting member is parallel to the at least one tray support and the busway support.

4. The overhead-mounted cable tray and busway support system of claim 1, wherein the horizontal mounting member is at least as long as the tray support.

5. The overhead-mounted cable tray and busway support system of claim 1, including a plurality of parallel tray supports, each of which is cantilevered from a same side of the vertical member and at a different point along a vertical axis.

6. The overhead-mounted cable tray and busway support system of claim 1, wherein the vertical member is affixed to a central portion of the horizontal mounting member.

7. The overhead-mounted cable tray and busway support system of claim 1, wherein the busway support includes two brackets for captively mounting each of the two busways.

8. The overhead-mounted cable tray and busway support system of claim 1, wherein the roof mounting assembly further includes a pair of threaded rods threadedly engaged at one end at different points along an axis of the rail member, and threadedly engaged at an opposite end either directly or indirectly to the roof of a building such that the height and horizontal angle of the rail member is adjustable.

9. The overhead-mounted cable tray and busway support system of claim 8, wherein the roof mounting assembly further includes a strut member mounted to an underside of the roof which is threadedly engaged to at least one of said threaded rods.

10. An overhead-mounted cable tray and busway support system, comprising:
    at least one roof-supported bracket including
        a vertical member,
        a horizontal mounting member affixed to a top end of the vertical member that is mountable directly or indirectly to a building roof,
        at least one tray support connected to the vertical member,
        a busway support connected to the vertical member and having a busway retaining flange that mounts two or more horizontal busways at different heights,
        wherein the at least one tray support and the busway support are parallel and cantilevered from a same side of the vertical member, and the horizontal mounting member is parallel to the at least one tray support and the busway support, and
    a roof mounting assembly that is connected to the horizontal mounting member of the bracket and which bears all of a weight load of the bracket.

11. The overhead-mounted cable tray and busway support system of claim 10, wherein the horizontal mounting member is at least as long as the tray support, and the tray support is no more than about one-third of the length of the vertical member.

12. The overhead-mounted cable tray and busway support system of claim 10, wherein the length of the horizontal mounting member is between about one and two lengths of the tray support and the vertical member is affixed to a central portion of the horizontal mounting member.

13. The overhead-mounted cable tray and busway support system of claim 10, wherein the busway support includes two busway brackets mounted on opposite sides of the busway retaining flange.

14. The overhead-mounted cable tray and busway support system of claim 13, wherein each of the busway brackets includes two opposing C-shaped members that capture each of the two busways such that the busways are longitudinally slidable within the busway brackets.

15. The overhead-mounted cable tray and busway support system of claim 10, wherein the roof mounting assembly includes a rail member suspended from an underside of the roof of a building that is parallel to and connected to the horizontal mounting member of the bracket.

16. The overhead-mounted cable tray and busway support system of claim 15, wherein the roof mounting assembly further includes a pair of threaded rods threadedly engaged at one end at different points along an axis of the rail member, and threadedly engaged at an opposite end either directly or indirectly to the roof of a building such that the height and horizontal angle of the rail member is adjustable.

17. The overhead-mounted cable tray and busway support system of claim 16, wherein the roof mounting assembly further includes a strut member mounted to an underside of the roof which is threadedly engaged to at least one of said threaded rods.

18. An overhead-mounted cable tray and busway support system, comprising:
    at least one roof-supported bracket including
        a vertical member,
        a horizontal mounting member having a central portion affixed to a top end of the vertical member that is mountable directly or indirectly to a building roof, two tray supports connected to the vertical member at different points along a vertical axis, and a busway support connected to the vertical member and having a busway retaining flange that mounts two or more horizontal busways at different heights with respect to each other, wherein each tray support and busway support connected to the vertical member is cantilevered from a same side of the vertical member and the tray supports and busway support are parallel to one another, and wherein the horizontal mounting member is at least as long as the tray supports and is parallel to the tray supports and the busway support, and a roof mounting assembly that is connected to the horizontal mounting member of the bracket having an elongated member that is parallel to and connected to the horizontal mounting member and which bears all of a weight load of the bracket.

19. The overhead-mounted cable tray and busway support system of claim 18, wherein the horizontal mounting member includes a horizontally-oriented mounting flange and a vertically-oriented stiffening flange, and the vertical member is affixed to both the horizontally-oriented mounting flange and a vertically-oriented stiffening flange.

* * * * *